UNITED STATES PATENT OFFICE.

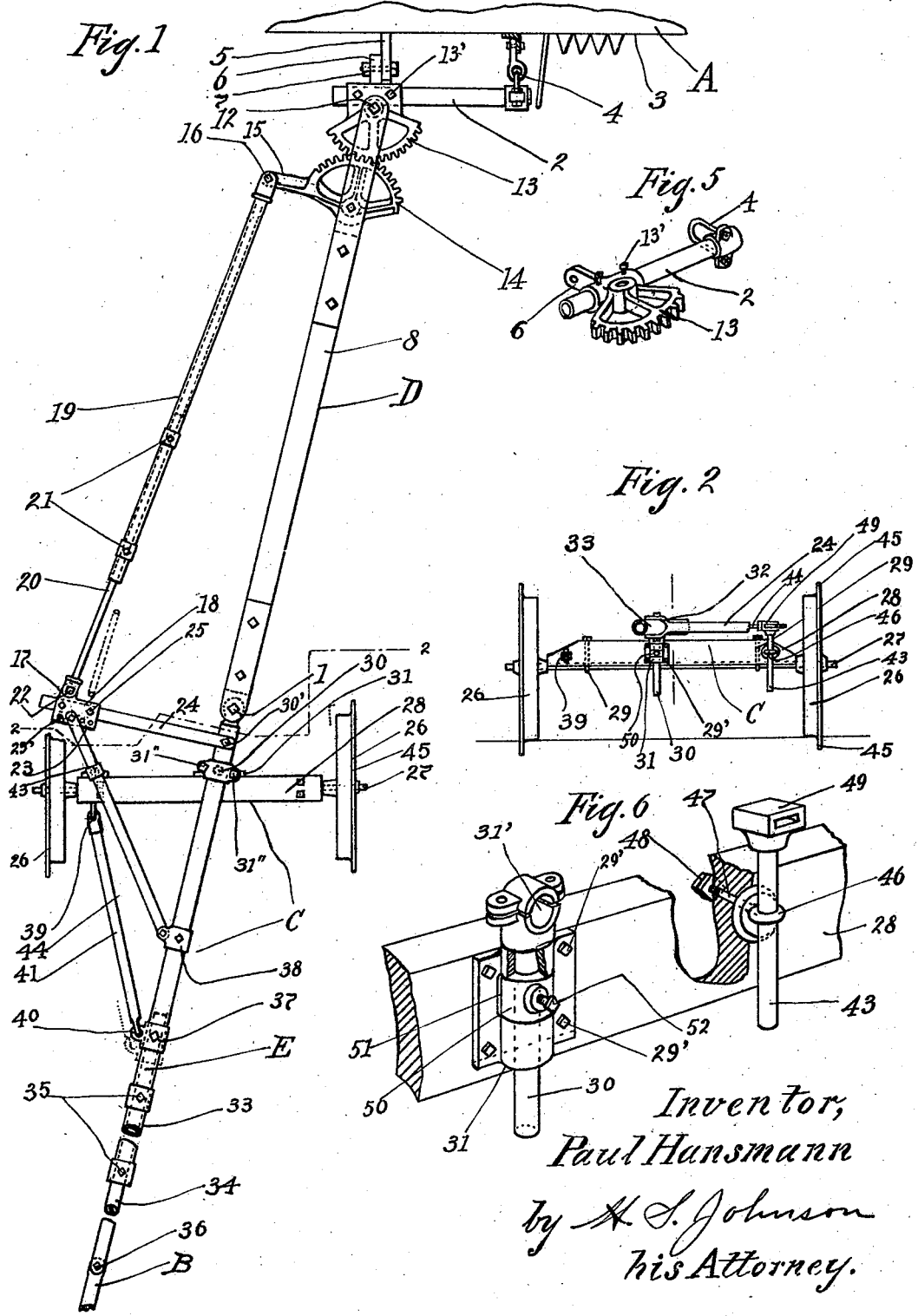

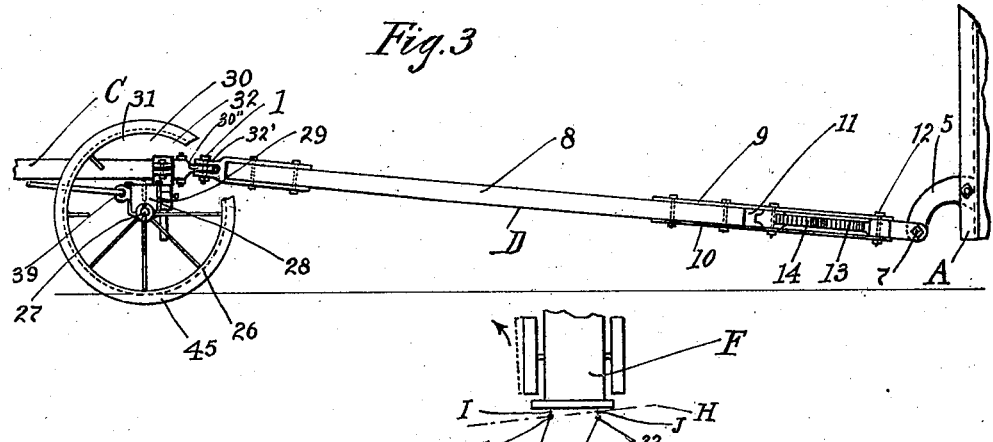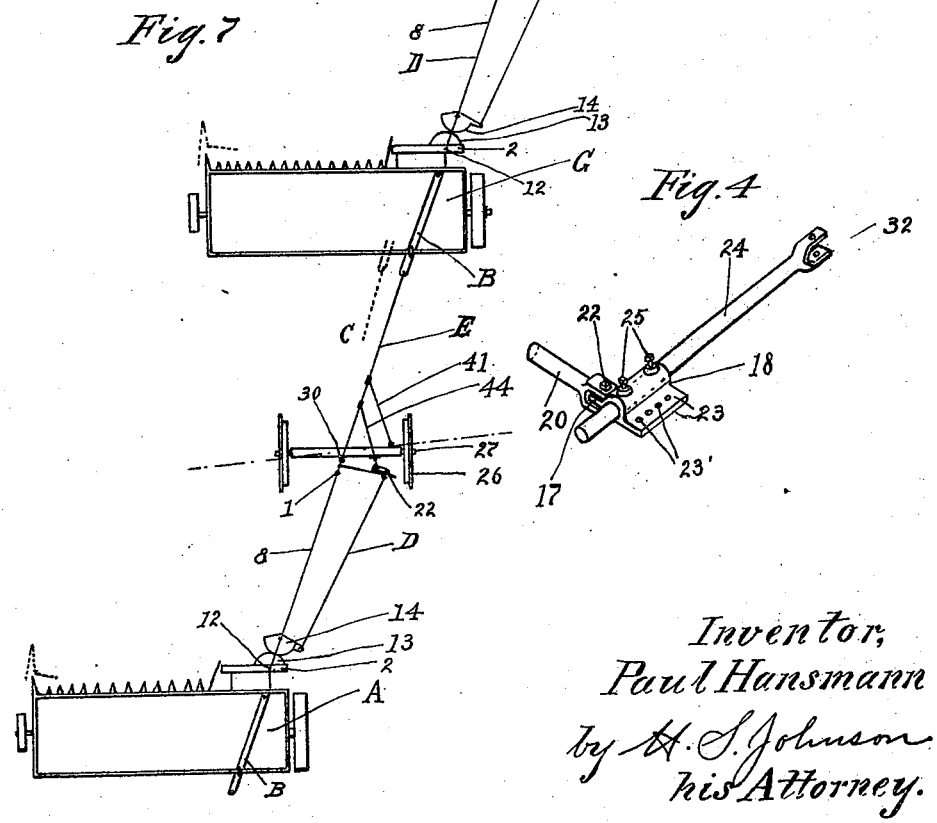

PAUL HANSMANN, OF LONG PRAIRIE, MINNESOTA.

COUPLING MECHANISM.

1,413,728.  Specification of Letters Patent.  Patented Apr. 25, 1922.

Application filed January 12, 1920. Serial No. 350,847.

*To all whom it may concern:*

Be it known that I, PAUL HANSMANN, a citizen of the United States, residing at Long Prairie, in the county of Todd and State of Minnesota, have invented certain new and useful Improvements in Coupling Mechanism, of which the following is a specification.

This invention relates to improvements in draft connections for coupling one vehicle behind another, such as grain binders wherein the succeeding vehicles are held in relatively offset positions.

An object of the invention is particularly to provide coupling mechanism which will automatically control the travel of one vehicle from the next forward vehicle and particularly cause each succeeding vehicle to turn a square corner.

A further object of the invention is to provide a coupling device part of which may be used for connecting the initial implement with the tractor, thereby obviating the necessity of having a special coupling for that purpose, all of the implements following the initial implement being connected together by the complete connecting device.

A still further object of the invention is to provide hitching means for connecting two binders wherein the forward part of the hitching means functions the same as the rear end of the tractor, the idea being to have the ground gripping element in parellelism with the drivers of the tractor and located at a position intermediate of the two binders, whereby the movement of the rearward binder may be effectively controlled.

A still further object of the invention is to provide a hitching device wherein the parts may be adjusted to accommodate swaths of various widths, and also to control the relative rate of speed and extent of the turning movements of the binder at the rear of the hitch.

To this end the invention consists in the construction, combination and arrangement of parts hereinafter described and claimed.

In the drawings:

Figure 1 is a plan view of the invention shown connecting two binders.

Figure 2 is a sectional elevation on line 2—2 of Figure 1.

Figure 3 is a fragmentary side elevation of the invention.

Figures 4, 5 and 6 are perspective views of details, and

Figure 7 is a diagrammatic plan view of the invention shown connecting a tractor with the initial binder frame, the binders being arranged to cut two contiguous swaths.

In Figure 1, A represents the front of a binder and B a draft bar secured to the binder frame. As shown in Figure 1, the invention is shown set at an angle as it appears when connecting two binders arranged in operative position. The invention consists of a tongue truck or wheeled section C and a rear binder hitch section D, the two sections being loosely pivotally connected together by means of the vertically disposed pivot pin 1, so that the connections will yield vertically on uneven ground. The hitch section D comprises a horizontally disposed bar 2 disposed parallel with the front edge 3 of the rear binder, the bar being pivotally connected with said edge by means of the pivot connection 4 at one end of the bar and the outwardly extending lug 5 on the binder the latter co-operating with the lug 6 to receive the horizontally disposed pivot pin 7 so that the bar 2 may be swung in a vertical plane.

Pivotally mounted on the bar 2 so as to swing laterally thereon is the draft bar 8 shown rectangular in cross section and having on its respective upper and lower faces and extending rearwardly to form a bifurcated end, the plates 9 and 10, said plates being pierced at their outer extremity by the vertically disposed pivot pin 12, the gear segment 13 rotating about said pivot pin in said bifurcation. The gear segment 13 may be moved along the bar 2, and rigidly set thereon as by means of set screws 13', as indicated in the drawings, and is preferably integral with the lug 6.

Pivotally mounted in the bifurcation and meshing with the gear segment 13 is the gear segment 14 both segments having preferably pitch circles of equal diameter, the gear segment 14 being provided with an outwardly extending arm 15.

Pivotally connected by means of pivot 16 with the arm 15 is the tubular member 19 telescopingly and slidingly supporting the rod 20, the latter being capable of adjustment lengthwise in the tubular member and adapted to be held positioned by the set screws 21. The rod 20 has pivotal connection 22 with the lug 17 forming part of the sleeve 18, the latter being formed opposite said lug and in the same plane therewith, with a flange member 23 pierced by a row of bolt holes 23'. The sleeve is bored to slidingly receive the tubular arm 24 and is provided with set screws 25 whereby it may be arbitrarily longitudinally positioned thereon. The pivots 1 and 22 are adapted to be directly connected to the pivot supports I and J of the tractor. Any hitch of the class described may be used.

The tongue truck section C comprises a pair of wheels 26 rotatably mounted on an axle 27, the latter being mounted on a cross beam 28 supported above the axle by means of U-bolts 29. Bolted to the side of the beam as by means of the bolts 29' is the journal block 31 which latter rotatably supports the vertically disposed pivot pin 30 said pin being formed at its top with a split clamping member 31' adapted to rigidly embrace and grip circumferentially the tubular tongue or draft member E by means of the bolts 31". A collar 50, forms part of the journal of said journal block and fits in a recess 51 in said block and has set screws 52 to secure it to the pivot pin 30. By moving the sleeve on the pin 30 the draft member E and the draft bar 8 may be raised or lowered as desired.

The tubular arm 24 is formed with a bifurcated end 32 adapted to fit over the draft member E and receives the vertically disposed pivot pin 30' so that said arm may be swung laterally around said pivot the latter piercing the draft member and both legs of said bifurcated end and being located on the draft member at a position between the pivots 30 and 1. The outer end of the draft member is formed with a horizontally disposed eye 30", said eye fitting loosely into the bifurcation at the end of the draft bar D and loosely receiving the pivot pin 1 of the draw bar.

The draft member E is extensible and comprises a tubular body portion 33 telescopingly and slidingly receiving the rod portion 34, the latter being securely held positioned therein by the set screws 35. At its outer end the rod portion 34 has loose pivotal connection by means of pivot pin 36 with the draft bar B on the binder so that the draft bar is free to oscillate about said pin.

Slidable on the tubular body portion 33 of the draft member are the sleeves 37 and 38, each sleeve being provided with a suitable set screw whereby it may be held firmly positioned on said tubular body portion. Having loose pivotal connection with the beam 28 and the sleeve 37 by means of pivotal connections 39 and 40 respectively, is the strut rod 41. Thus, when the sleeve 37 is slid longitudinally on the tubular portion 33 of the draft member E the angle of the axis of the axle 27 relative to the draft bar E may be arbitrarily changed.

The sleeve 38 has loose pivotal connection with one end of the bar 44, the outer end of the latter being pivoted in one of the bolt holes 23', the bar 44 and the arm 24 thus forming a knee extending laterally from the draft member. Thus, when the sleeve 38 is moved longitudinally on the tubular body portion 33 the angularity of the arm 24 relative to the draft member E may be changed which in turn would affect the relative positions of the segmental gears 13 and 14, thereby changing the angularity of the bar 2 relative to the draft member D.

When it is desired to adjust the invention so as to cut a swath of different width it is only necessary to adjust the angularity of the bar 2 relative to the draft member D and the angularity of the axle 27 to correspond to the angularity of the bar 2 so as to bring them into parallelism.

To change the degree to which the binder is swung about the pivot 12 the sleeve 18 is adjusted longitudinally on the arm 24 thereby changing the distance between the pivots 1 and 17, the members 19 and 20 being adjusted accordingly by means of the set screws 21, as is also the bar 44 by means of its pivot 23' and the sleeves 38. Obviously, as the sleeve 18 is moved inwardly in the direction of the draw bar D its pivot 17 will travel (when the truck is turned) through a proportionately shorter distance in a given movement of the truck and inversely as the sleeve 18 is moved outwardly. Thus the path of travel of each succeeding binder, when they are being drawn around a corner, may be so controlled by proper adjustment of the sleeve 18, as to effect the cutting of a sharp corner in the standing grain.

Referring to Figure 7 of the drawing, F represents the rear portion of a tractor showing its draw bar, and A and G the binders. The tractor is connected with the binder G by means of the rear hitch section D. The binders A and G, however, are connected by means of the rear hitch section D attached to the truck section C, the two being operatively connected together. As indicated in the drawing the draft member E is connected to the draw bar B of the binder G, the draft member and draft bar being in straight alignment between the two binders.

When the tractor turns as indicated by the arrow the pivots 1 and 22 will be moved into a plane H indicated in dotted lines while the axis of axle 27 moves parallel therewith thus communicating exactly the same degree of motion to each of the binders G and A, the truck assuming the exact successive positions indicated by the plane H of the tractor.

In order to provide a good footing in the soil for the truck, the wheels are provided with a comparatively large side rib 45, the wheels being comparatively large in diameter and the axle being built up by means of the beam 28 so as to bring the forward end of the draft-bar 8 considerably above the pivot 7 at its opposite end. As the pivot 7 is customarily located near the ground, that is, about eight or ten inches therefrom, and as the binder weighs upwards of 1200# the resultant downward pressure on the wheels 26 when the train is moving is sufficient to anchor the latter firmly enough to effectively control the movements of the binder A. It has been found by experiment that this downward pull on the wheels 26 greatly aids in so anchoring the truck as to effect a very precise movement of the binder. But since binders vary in weight, and there exists a constant tendency to lift the rear of the forward binder at pivot 36, it is desirable to be able to raise or lower the joined ends of the draft member E and the draw bar 8 for the purpose of varying the upward pull at 12 and 36 respectively. To this end the adjustable draft member and draft bar support on the beam 28 described in the foregoing is provided. The mechanism extending from the rear binder to the truck section C may be termed vibratory or reciprocatory in that the segments 13 and 14 and the arm 24 to which they are operatively connected reciprocate or vibrate back and forth during a complete turn around a corner.

An adjustable support (Figure 6) for the connecting mechanism extending from the segment 14 to the draft member E is provided to co-operate with the draft bar support, to steady the mechanism and comprises a vertically disposed shank 43 slidably projected through the eye 46 of the eye bolt 47, the latter being suitably secured in one end of the beam 28 as by means of the nuts 48 and being adapted to firmly grip the shank 43 when the nuts are drawn tight. At the top of said shank the support is formed with a head 49 adapted to slidably receive the bar 44.

It is to be noted that when the sleeve 38 is slid along the body of the draft member E for the purpose explained in the foregoing, the bar 44 will slide in the head 49 and also pivot thereon, the outer end of the bar being pivoted in that bolt hole 23' which is nearest in alignment. In operation, the binders are arranged in offset relation to cut the swath desired, the draw bars being brought into straight alignment with each other and set at the truck to the desired level by means of the collar 50. The axle of the truck is now set so as to be parallel with the front of the binders and the sleeves 37 and 38 respectively are then firmly positioned. The proper adjustment of the sleeve 18 is then found by trial, the sleeve being moved back and forth until the machines cut a square corner in the grain. The draft member E must also be adjusted to measure the proper length between the pivots 7 and 36, as this distance must be such as to permit the two binders to turn a corner with a liberal clearance between their outer ends, or in other words the ends opposite the bull wheel.

I claim:

1. The combination with two spaced vehicles arranged one behind the other and a binder hitch of the class described operatively connected to the front of the rear vehicle, of a truck including a tongue, said truck being normally arranged axially parallel with said vehicles and operatively connected with said hitch to actuate the latter when said tongue is swung laterally, said tongue extending to the forward vehicle and being pivotally connected therewith, and means for lengthening said tongue.

2. The combination with two vehicles arranged one behind the other and a binder hitch of the class described operatively connected to the rear vehicle, said hitch including members one movable relative to the other to effect a movement of the rear vehicle when said members are moved, of a tongue truck including a tongue having a knee extending laterally therefrom the forward end of said tongue being pivoted to the forward vehicle, pivotal connections between said tongue and its knee and said members so as to effect a movement of one of the latter relative to the other when said tongue is moved laterally and means for shifting a part of said pivotal connections on said knee whereby to modify the movement of one of said members relative to the other.

3. The combination with vehicles arranged one behind the other and a binder hitch of the class described, operatively connected with the rear vehicle said hitch including horizontally spaced pivots at the forward end thereof, of a tongue truck including a tongue, supporting means in connection with the tongue and including the latter for supporting the forward end of said binder hitch and being connected with said pivots, said tongue extending to the forward vehicle and having pivotal connection therewith, and means on the tongue for varying the length thereof and on the truck for varying the height of the rearward end thereof relative to the ground whereby adjacent ends of the tongue and binder hitch may be arbitrarily raised and at the same time the distance between the binders maintained.

In testimony whereof I affix my signature.

PAUL HANSMANN.